UNITED STATES PATENT OFFICE.

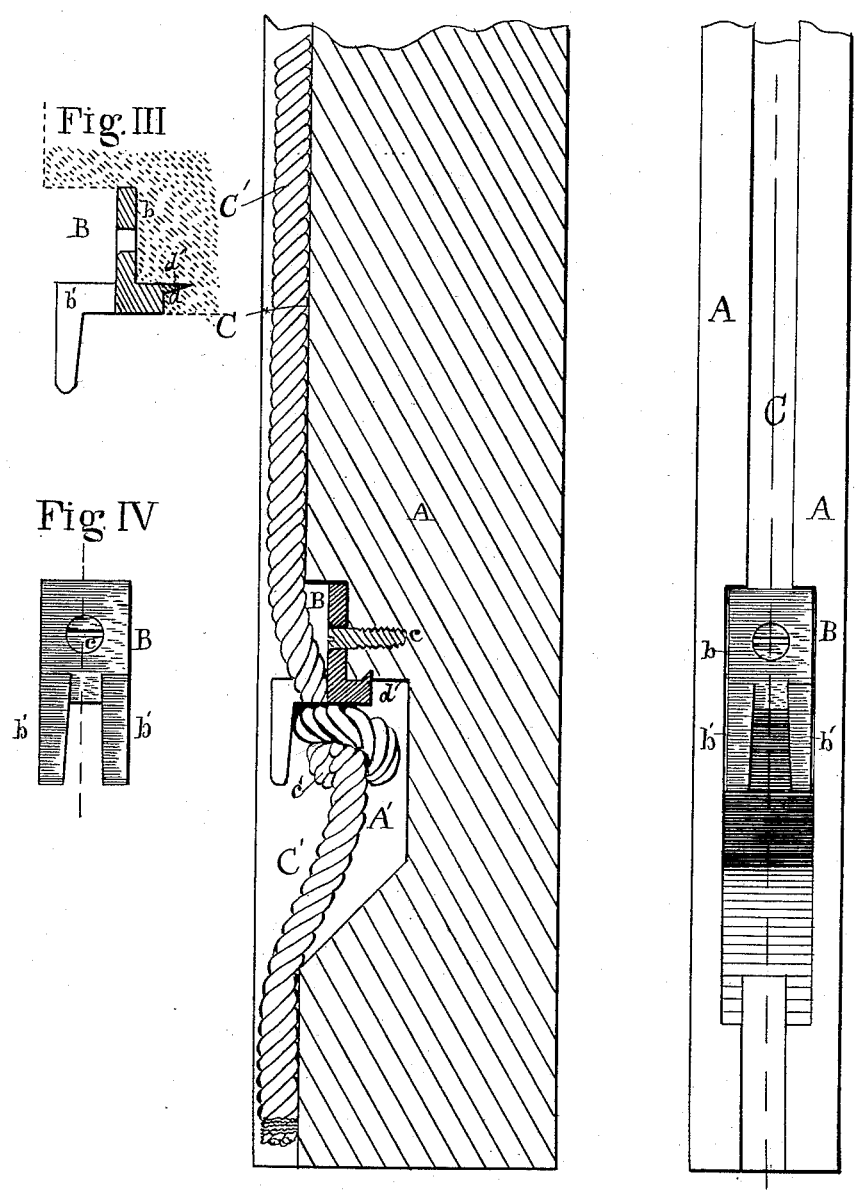

ABRAHAM OBERNDORFER, OF NORFOLK, VIRGINIA.

SASH-CORD FASTENER.

SPECIFICATION forming part of Letters Patent No. 333,775, dated January 5, 1886.

Application filed November 5, 1885. Serial No. 181,909. (No model.)

*To all whom it may concern:*

Be it known that I, ABRAHAM OBERNDORFER, a citizen of the United States, residing at Norfolk, in the county of Norfolk and State of Virginia, have invented a new and useful Improvement in Sash-Cord Fasteners, of which the following is a specification, reference being had to the accompanying drawings.

This invention relates to improvements in sash-cord fasteners, which will be hereinafter more particularly described, and pointed out in the claim.

In the accompanying drawings, forming part of this specification, Figure I is an edge view of one stile of a sash, showing the face of the fastener which is inserted in a recess of the stile. Fig. II is a vertical section of the stile on line $x\,x$ of Fig. I. Fig. III is a section of the fastener on $y\,y$ of Fig. IV. Fig. IV is a face view of the fastener.

A represents a stile of a sash having formed in it a recess, A', near the lower end, of such shape and size as will accommodate the fastener and have it entirely within the stile, as shown in Fig. 2. In the edge of the stile is formed the usual groove, C, for the hanging-cord C'.

B is the fastener, cast of any suitable metal, consisting of the flat shank $b$, from which arise the two prongs $b'\,b'$, having a space between them a little smaller than the diameter of the cord C'. In the shank is a hole for a screw, $c$. Below the shank $b$ is a shoulder, $d$, having a sharp projecting lip, $d'$, the purpose of which lip is to enter the grain of the wood. By means of the shoulder $d$, which bears hard against the end of the recess, the strain of the cord is taken by the stile itself, and only one screw is necessary to fasten the holder to the stile. The sharp lip entering the wood assists in keeping the shank securely down. On the cord C' is made a knot, $c'$, having a short loose end only long enough to take hold of for detaching the knot when necessary.

The recess A' can be formed in various ways for the reception of the fastener and the cord, all to be inclosed within the line of the edge of the sash-stile. The drawings show a mortised recess having straight sides and ends; but a recess may be made by boring two or more holes with a center-bit, intersecting each other so as to form a continuous recess—as, for instance, one hole with the center at the screw $c$. The other holes can be made so as to contain the knot $c'$ and the loose end of the cord, thus greatly reducing the cost of labor required in fitting the fastening. The shoulder $d$ would then be cast of a shape to fit the bored hole.

I am aware that other fasteners have been used somewhat similar in character for readily attaching and detaching the sash-cord, and I do not claim, broadly, such devices, but confine myself to the specific construction of the shank of the fastener for securing it to the recess; and

What I claim is—

In a sash-cord fastener, the combination of the shank B, having a rearwardly-extending flange and securing-lip, $d'$, and the fork $b'$, for the retention of the knot in the end of the sash-cord, extending downwardly and in an opposite direction from the main body of said shank.

In testimony that I claim the foregoing as my own I hereto affix my signature in presence of two witnesses.

ABRAHAM OBERNDORFER.

Witnesses:
 WM. R. SINGLETON,
 W. C. DUVALL.